Patented Jan. 23, 1968

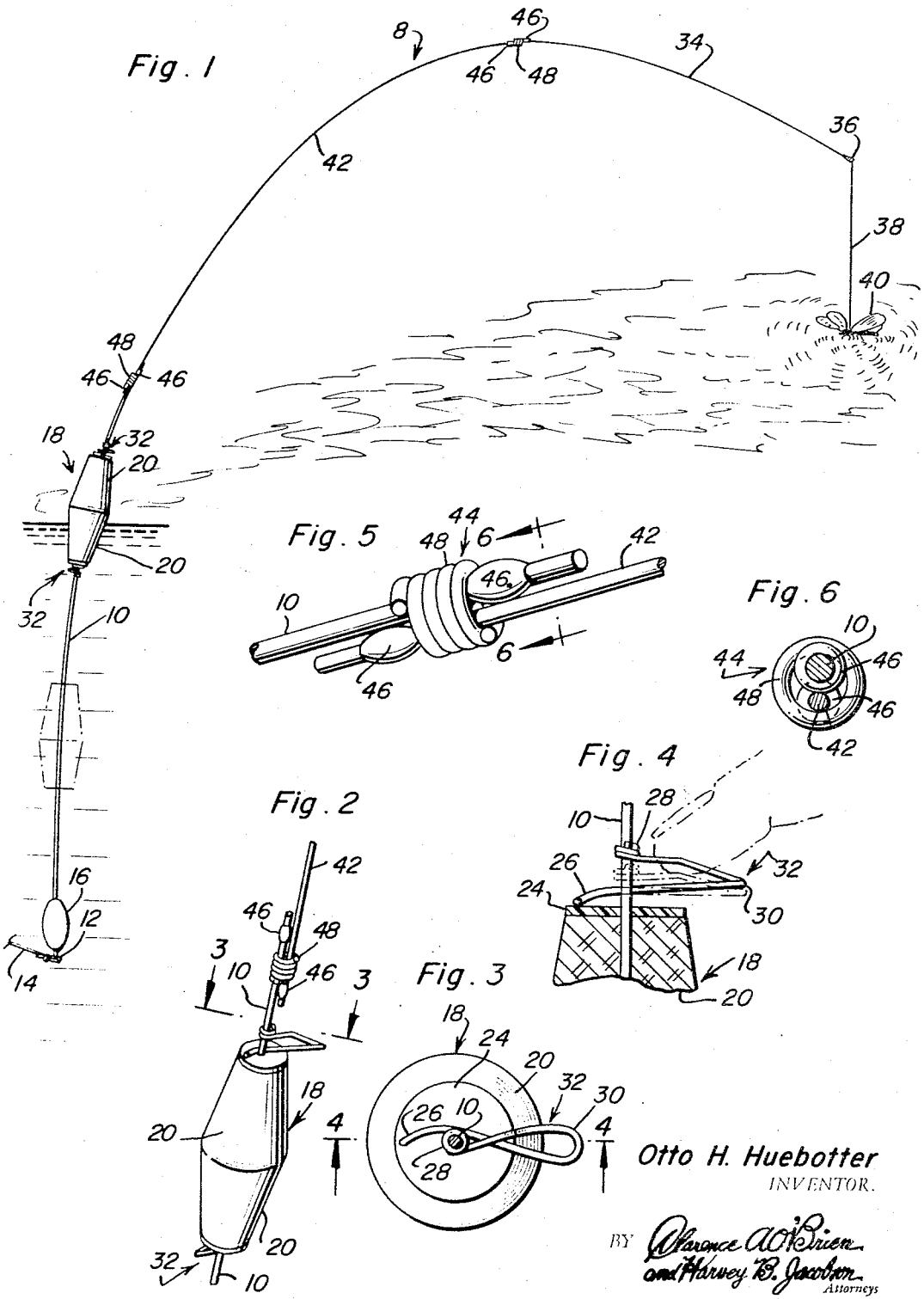

3,364,614
BALANCED LINE-CONTROLLED TERMINAL
TACKLE WITH ADJUSTABLE FLOAT
Otto H. Hueboffer, 1567 Gillette St.,
San Antonio, Tex. 78224
Filed Oct. 22, 1965, Ser. No. 501,733
10 Claims. (Cl. 43—43.15)

ABSTRACT OF THE DISCLOSURE

The invention is adapted for use in conjunction with the outer end of a fishing line on a casting rod and reel or, alternatively, a spinning rod and reel. The construction is such that a lure, a fly for example, is dangled slightly above the water's surface and intermittently and momentarily allowed to dip into the water in a manner to attract a fish. The flexible wire unit provides a reach arm which is flexible and resilient and is of sectional telescoping construction. The lower rearward or terminal end is provided with a fixedly attached weight of suitable heaviness. A fishing line is attached to the lower end immediately below the bottom of the weight. A streamlined bobbing and balancing float is slidingly, adjustably and retentively mounted on the reach arm and is oriented with and manually adjustable toward and from the weight.

---

This invention relates to certain new and useful improvements in fishing tackle, more particularly, to terminal tackle for use at the forward end of a fishing line carried by a casting rod and reel or, alternatively, a spinning rod and reel.

The concept has to do with improved terminal tackle for top water bait-type fish which is functionally designed and structurally suitable for positioning a lure, for example, a fly, slightly above the water's surface and deceptively, intermittently and momentarily causing it to dip and alight and, in so doing, to simulate the actions of an insect hovering, flying and occasionally dipping into water, whereby to thus attract the attention of a victim fish.

A fisherman using a casting rod and reel or a spinning rod and reel has been unable to properly use a fly, that is, without attaching a weight to the end of the line, which, of course, defeated the very purpose of the fly in that it was carried to the bottom of the water. It follows that the objective in the instant matter is to provide means which will aptly and effectively enable a casting rod and reel fisherman or a spinning rod and reel fisherman to effectively and successfully use a fly when fishing for top bait-type fish in fresh water pools and the like.

The improved terminal tackle is characterized by elongated leader elevating and suspending means, more particularly, end-to-end and interconnected bendably resilient wires which define and provide an elongated reach arm. A minimal but significant rearward or lower end portion of this arm depends, when in use, into the water which is being fished. The major portion of the arm is suspended above the surface of the water and spans the water at the requisite level or height and functions in a unique manner to be hereinafter more specifically set forth. The extreme rearward end of this reach arm is provided with a fixedly mounted sinker or weight which submerges that portion of the arm to which the leading end of the fishing line is connected for requisite control by the fisherman. A float or bobber is adjustably mounted on the reach arm at a prescribed distance above the submerging weight. That portion of the reach arm above and forwardly of the top of the float is longitudinally bowed and supported in the aforementioned elevated state and position. The forward end of the reach arm is appropriately flexible and resilient, is provided with and suspends an appropriate leader. The fly or other bait is attached to the lower end of the leader.

When the device is cast the weighted end of the arm causes it to descend beneath the surface of the water but is buoyed up and maintained in a floating position by the bobber or float. The elevated portion of the arm, being flexible and carrying the leader at the tip of its forward end flexes or bends toward the water's surface thereby suspending the fly slightly above the surface of the water. The slightest motion by the fisherman tugs the line causing the bendably resilient end of the arm to dip the lure or fly into the water where it is momentarily held by the natural force of being submerged and gives the fly or lure the appearance of a fallen insect which is trying to free itself from the water's surface.

A terminal tackle device constructed in accordance with the principles of the present invention has been experimentally and successfully used and has been found to well serve the purposes for which it is intended.

In carrying out the principles of the invention emphasis is attached to the control and maneuverability of the free-to-float device due to the fact that the leading end of the controllable line is attached to the weighted submerged end of the roving reach arm. Satisfactory and reliable balance of the device is attainable by the shiftably adjustable float. The components of the overall device are amply streamlined to offset fishing difficulties. Then, too, the float features simple and readily actuatable spring biased retaining clips or equivalent means whereby the float retains its given position for predetermined supporting and balancing results.

Whereas it would be within the purview of the overall concept to utilize a one piece arm made up of graduated lengths of stainless steel wire joined end-to-end, it has been found that it is in keeping with best results that the arm be made up of rearward, forward and intermediate component parts whose adjacent ends are overlapped and, in a manner of speaking, telescopingly connected together to provide for collapsibility, compactness and convenience in handling, packaging and storage, thus adding to the versatile character of the invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing the invention and how it is constructed and is intended to be used for satisfactory results;

FIGURE 2 is an enlarged fragmentary view in perspective which serves to detail one end of the float and its retaining means and the adjacent adjustable and telescoping connection between component parts of the overall reach arm;

FIGURE 3 is an enlarged view taken on the plane of the section line 3—3 of FIGURE 2;

FIGURE 4 is a fragmentary view in section and elevation taken on the plane of the section line 4—4 of FIGURE 3 and showing, in phantom lines, how the retaining clip is released and applied;

FIGURE 5 is an enlarged fragmentary perspective view which details the telescopingly connectible overlapping ends of the sections or components of the reach arm; and FIGURE 6 is a section taken on the plane of the section line 6—6 of FIGURE 5.

Referring now to the views of the drawing it will be seen that the main component or part of the overall terminal tackle is designated as an elongated bendably resilient reach arm 8. While this unit could be constructed of telescoping tubes of suitable yieldability, it is preferably constructed from three lengths or sections of stainless steel wire. The rearward wire or member 10 is of such length that it may be suitably suspended substantially wholly or partly in the water as shown in FIG. 1. The extreme lower end is provided with an eye, swivel or the like 12 (not detailed) to which the leading end of the fishing line 14 is tied or otherwise suitably connected. Just above the eye an ovate sinker or weight 16 is fixedly mounted. The slidingly adjustable or shiftable supporting and balancing float or bobber is denoted generally at 18. This float, generally made of cork, is elongated and streamlined, that is, has tapering upper and lower half-portions 20 and 22. The ends of the float are flat and provided with attached end plates or washers 24 as shown in FIG. 4. The float is axially bored and the portion of the wire shown in FIG. 4 extends therethrough making it possible to shift and adjust the float by hand. It is desired to set and maintain the float in a given position. Simple retaining devices are employed for this purpose. Each device is preferably, but not necessarily, constructed from a length of stainless steel wire which has one end portion 26 anchored eccentrically on the washer. The opposite end of the wire is coiled upon itself and fashioned into an eye 28 which is normally canted as shown in FIG. 4 and has frictional gripping relationship with the wire or member 10. The intermediate portion of this wire is fashioned into a projecting loop 30 which constitutes a satisfactory fingerpiece and which can be depressed from the full line to the dotted line position shown to release the eye and to permit adjustment of the float. The overall retainer is referred to as a spring wire clip 32. Its use and operation are clear upon examining FIG. 4 in conjunction with the other views.

The forward section or member of the overall arm 8 is denoted at 34 and it, too, comprises a length of stainless steel wire which is of a gauge less than the other components or sections and is freely bendable and normally arches down to assume the forwardly and downwardly inclined position shown at the right in FIG. 1. The terminal or tip portion 36 is suitably constructed to permit a leader 38 to be attached thereto. The leader is of suitable length and is provided at its lower end with a lure, for example, the fly 40. The intervening or intermediate component or section of the arm also comprises a suitable length of stainless steel wire and it is denoted at 42 and it is thinner in gauge than the wire 10 and thicker than the wire 34. Instead of joining the several components or sections 10, 34 and 42 together in integral and end relationship, which is permissible, the end portions are preferably overlapped and telescopingly and adjustably interconnected. In carrying out this phase of the invention the interconnecting and adjusting means is preferably but not necessarily that which is shown in FIG. 5 and which is denoted generally by the numeral 44. To the ends desired, each member is provided with an ovate enlargement 46 and these enlargements are arranged, when the rod ends are overlapped on opposite sides of a friction gripping collar, preferably a simple coil spring 48. The spring encircles the coacting overlapping ends and functions to grippingly bind them together to provide the desired telescoping joint. It is this phase of the concept which provides the aforementioned compact and convenient feature for adjusting, packaging, collapsing and practical transportation and storage requirements.

The adjusting joint is arranged between the adjacent ends or sections 34 and 42 and also between the ends of the sections 10 and 42 as shown in FIG. 1.

It will be understood that the invention is completely controllable at all times by the fisherman in current or still water and the lure can be made to simulate the natural flight or hovering of an insect at, near or above the water at the will of the fisherman at all times when in use. The streamlined and tapered construction, particularly of the float functions well in that neither the float nor any other part of the elongated flexible device projects in any manner that would become entangled in reeds or other underwater vegetation. The line is attached at the end of the device allowing the same to be a continuous portion of a singular linear unit from the reel and rod to the lure or fly itself such that when a fish becomes hooked on the device the entire unit is pulled in a plane of flight or retreat, streamlined, and without drag or projecting impediments to the retrieving of what is commonly called "playing" the fish on the line until he has spent his energy and can be easily drawn to shore. The only attachable and separate part of the invention is the float and this is maintained in position on the device by the spring tension of the clip means 32 which permits easy adjustment and precludes any detachment or loss of the float while using the device in fishing. The invention constitutes a balanced unit which necessitates only slight adjustment of the float upward or downward to achieve the desired suspension or floation of the lure at, near, above or on the surface of the water as desired. The principle of balance is stressed in the construction and use as is believed to be self-evident from the description and drawings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in conjunction with the outer end of a fishing line on a casting rod and reel or, alternatively, a spinning rod and reel; terminal tackle for top water bait type fish having the capability of positioning and holding a lure, a fly for example, slightly above the water's surface and intermittently and momentarily dipping the same into the water in a manner to attract a fish comprising, in combination, elongated leader elevating and suspending means having a rearward end portion adapted to depend into the water being fished and median and forward end portions adapted to assume a normal fishing position elevated above the water's surface, the terminal part of said rearward end portion being provided with a submerging weight of prescribed heaviness, a fishing line attached to said terminal part immediately below the bottom of said weight, a leader attached to and hung from the free outer end of said means and carrying a lure, and a streamlined bobbing and balancing float slidingly, adjustably and retentively mounted on said means between the rearward and forward ends thereof, located at a level above, oriented with, manually adjustable toward and from said weight.

2. The terminal tackle defined in claim 1, and wherein said means is flexible and resilient, the forward end portion being responsively and sensitively yieldable so that the free tip end suspending the lure is caused to flex and curve downwardly, whereby the attached lure, a fly for example, simulates the actions of an insect hovering and flying above and occasionally dipping into the water.

3. The terminal tackle according to claim 1, and wherein said means is characterized by an elongated relatively limber non-corrodible member constituting and providing a reach arm, said float being manually adjustable along that portion of the arm on which it is shiftably mounted, said weight being fixedly attached to said rearward terminal end portion.

4. The terminal tackle according to claim 1, and wherein said means is characterized by an elongated relatively limber stainless steel wire member constituting and providing a reach arm, said float being manually adjustable along that portion of the arm on which it is shiftably mounted, said weight being fixedly attached to said rearward terminal end portion, that portion of the arm immediatel below said weight having eye means with which said line is connected.

5. The terminal tackle defined in claim 3, and wherein said reach arm is longitudinally extensible and retractible and is capable of adjustment lengthwise and also capable of being telescoped for compact and convenient packaging, carrying and storing.

6. The terminal tackle defined in claim 3, and wherein said float is axially bored, said means passing through the bore of the float, said float being elongated and having upper and lower tapered half-portions to minimize the likelihood of entanglement with submerged vegetation, debris or similar obstructions in the water.

7. The terminal tackle defined in claim 3, and wherein said float is elongated, tapered and streamlined to minimize the likelihood of entanglement with submerged vegetation, debris or similar obstructions in the water, said float being provided at at least one end with manually regulatable clip means attached to and carried by the float and having a spring biased friction retained eye canted and shiftably encircling a coacting portion of said arm proximal to said float.

8. The terminal tackle defined in claim 3, and wherein said float is elongated, tapered and streamlined to minimize the likelihood of entanglement with submerged vegetation, debris or similar obstructions in the water, said float being provided at each end with manually actuatable and controllable float adjusting and retaining means, each means comprising a resilient wire clip having one end secured to the coacting end of said float, having a canted coiled eye at its opposite end encircling a coacting wire component of said reach arm, and having its median portion fashioned into a finger trippable pressure responsive release member.

9. Top water bait type terminal tackle means capable of use with a casting rod and reel or, alternatively, with a spinning rod and reel comprising: a rearward elongated bendably resilient member provided at its rearmost end with a fixedly mounted submerging weight of predetermined heaviness and immediately below said weight with an eye for attachment thereto of the leading end of a fishing line, an elongated streamlined balancing and bobbing float shiftably and adjustably mounted on said rearward member at a level well above the level of said weight and having manually releasable retaining means cooperable with said member, a forward elongated bendably resilient member more flexible and limber than said rearward member, the leading end of said forward member being provided with a leader adapted to depend and suspend a bait such as, for example, a fly in an alluring position hovering over the surface of the water being fished, and an intermediate elongated bendably resilient member more flexible and limber than said rearward member and less flexible than said forward member, the adjacent ends of said members being telescopingly overlapped, the respective overlapping end portions being encompassed by assembling and interconnecting coil springs, and the respective springs being retained in their given positions by limit stops provided on terminal end portions of said members and spaced apart with said coil springs situated between adjacent complemental limit stops.

10. The tackle means as set forth in claim 9, and wherein each member comprises a length of stainless steel wire, said releasable retaining means comprising stainless steel spring wire clips.

References Cited

UNITED STATES PATENTS

| 2,157,819 | 5/1939 | Eckert | 43—43.15 |
| 2,456,254 | 12/1948 | Caruso | 43—43.15 |
| 2,710,480 | 6/1955 | Gehrig | 43—43.15 |

FOREIGN PATENTS 278,853  2/1952  Switzerland.

SAMUEL KOREN, *Primary Examiner.*

D. J. LEACH, *Assistant Examiner.*